(12) United States Patent
Bernbo et al.

(10) Patent No.: US 10,769,177 B1
(45) Date of Patent: *Sep. 8, 2020

(54) VIRTUAL FILE STRUCTURE FOR DATA STORAGE SYSTEM

(71) Applicant: Pure Storage, Inc., Mountain View, CA (US)

(72) Inventors: Stefan Bernbo, Karlskrona (SE); Christian Melander, Rodeby (SE); Gustav Petersson, Karlskrona (SE); Roger Persson, Karlskrona (SE)

(73) Assignee: Pure Storage, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,716

(22) Filed: May 13, 2019

Related U.S. Application Data

(63) Continuation of application No. 15/941,774, filed on Mar. 30, 2018, now Pat. No. 10,430,443, which is a
(Continued)

(51) Int. Cl.
*G06F 3/00* (2006.01)
*G06F 16/28* (2019.01)
(Continued)

(52) U.S. Cl.
CPC .............. *G06F 16/285* (2019.01); *G06F 9/54* (2013.01); *G06F 16/182* (2019.01);
(Continued)

(58) Field of Classification Search
CPC ....................................................... G06F 9/54
(Continued)

(56) References Cited

U.S. PATENT DOCUMENTS 3,707,707 A   12/1972   Spencer et al.
5,713,017 A   1/1998   Lin et al.
(Continued)

FOREIGN PATENT DOCUMENTS

CN   1726454   1/2006
CN   101710339   5/2010
(Continued)

OTHER PUBLICATIONS

Huakai Zhang, Implementation and Evaluation of Scalable Yo API on Cluster System. (Year: 2000).*
(Continued)

*Primary Examiner* — Lechi Truong
(74) *Attorney, Agent, or Firm* — ALG Intellectual Property, LLC

(57) ABSTRACT

An exemplary method includes identifying, within a first data item stored in a data storage system, a reference to a second data item stored in the data storage system, determining, based on the reference, that a storage location of the second data item is within a cluster of storage nodes included in the data storage system, sending, based on the determining that the storage location of the second data item is within the cluster of storage nodes, a request for the second data item to the storage nodes included in the cluster, and receiving, based on the request, the second data item from a particular storage node included in the cluster.

17 Claims, 9 Drawing Sheets

Related U.S. Application Data continuation of application No. 14/997,098, filed on Jan. 15, 2016, now Pat. No. 9,965,542, which is a continuation of application No. 14/098,021, filed on Dec. 5, 2013, now Pat. No. 9,305,012, which is a continuation of application No. 13/224,415, filed on Sep. 2, 2011, now Pat. No. 8,645,978.

(51) Int. Cl.
  *G06F 16/182*   (2019.01)
  *G06F 16/22*    (2019.01)
  *G06F 9/54*     (2006.01)
  *H04L 12/24*    (2006.01)

(52) U.S. Cl.
  CPC ........ *G06F 16/184* (2019.01); *G06F 16/1834* (2019.01); *G06F 16/22* (2019.01); *H04L 41/0213* (2013.01)

(58) Field of Classification Search
  USPC ........................................................ 719/310
  See application file for complete search history.

(56) References Cited

U.S. PATENT DOCUMENTS

| | | | |
|---|---|---|---|
| 5,787,247 A | 7/1998 | Norin et al. | |
| 6,003,065 A | 12/1999 | Yan et al. | |
| 6,021,118 A | 2/2000 | Houck et al. | |
| 6,055,543 A | 4/2000 | Christensen et al. | |
| 6,101,508 A * | 8/2000 | Wolff .................. | G06F 9/52 709/223 |
| 6,259,701 B1 | 7/2001 | Shur et al. | |
| 6,345,308 B1 | 2/2002 | Abe | |
| 6,389,432 B1 | 5/2002 | Pothapragada et al. | |
| 6,470,420 B1 | 10/2002 | Hospodor | |
| 6,510,162 B1 | 1/2003 | Fijolek et al. | |
| 6,728,716 B1 * | 4/2004 | Bhattacharya ...... | G06F 21/6227 |
| 6,732,237 B1 | 5/2004 | Jacobs et al. | |
| 6,782,389 B1 | 8/2004 | Chrin et al. | |
| 6,839,815 B2 | 1/2005 | Kagami et al. | |
| 6,925,737 B2 | 8/2005 | Bolduan et al. | |
| 6,985,956 B2 | 1/2006 | Luke et al. | |
| 7,039,661 B1 | 5/2006 | Ranade et al. | |
| 7,200,664 B2 | 4/2007 | Hayden | |
| 7,206,836 B2 | 4/2007 | Dinker et al. | |
| 7,266,556 B1 | 9/2007 | Coates | |
| 7,320,088 B1 | 1/2008 | Gawali | |
| 7,340,510 B1 | 3/2008 | Liskov et al. | |
| 7,352,765 B2 | 4/2008 | Dai et al. | |
| 7,376,945 B1 | 5/2008 | Kakumani et al. | |
| 7,385,978 B1 | 6/2008 | Yang et al. | |
| 7,406,484 B1 | 7/2008 | Srinivasan et al. | |
| 7,487,305 B2 | 2/2009 | Hill et al. | |
| 7,503,052 B2 | 3/2009 | Castro et al. | |
| 7,546,486 B2 | 6/2009 | Slik et al. | |
| 7,565,419 B1 | 7/2009 | Kwiatkowski et al. | |
| 7,568,069 B2 | 7/2009 | Jantz et al. | |
| 7,574,488 B2 | 8/2009 | Matsubara | |
| 7,590,672 B2 | 9/2009 | Slik et al. | |
| 7,593,966 B2 | 9/2009 | Therrien et al. | |
| 7,624,155 B1 | 11/2009 | Nordin et al. | |
| 7,624,158 B2 | 11/2009 | Slik et al. | |
| 7,631,023 B1 | 12/2009 | Kaiser et al. | |
| 7,631,045 B2 | 12/2009 | Boerries et al. | |
| 7,631,313 B2 | 12/2009 | Mayhew et al. | |
| 7,634,453 B1 | 12/2009 | Bakke et al. | |
| 7,647,329 B1 | 1/2010 | Fischman et al. | |
| 7,694,086 B1 | 4/2010 | Kulkarni et al. | |
| 7,769,711 B2 | 8/2010 | Srinivasan et al. | |
| 7,778,972 B1 | 8/2010 | Cormie et al. | |
| 7,822,711 B1 | 10/2010 | Ranade | |
| 7,822,766 B2 | 10/2010 | Arndt et al. | |
| 7,840,992 B1 | 11/2010 | Dufrene et al. | |
| 7,873,650 B1 | 1/2011 | Chapman et al. | |
| 7,885,982 B2 | 2/2011 | Wight et al. | |
| 8,060,598 B1 | 11/2011 | Cook et al. | |
| 8,073,881 B1 | 12/2011 | Georgiev | |
| 8,190,561 B1 | 5/2012 | Poole et al. | |
| 8,255,430 B2 | 8/2012 | Dutton et al. | |
| 8,296,398 B2 | 10/2012 | Lacapra et al. | |
| 8,401,997 B1 | 3/2013 | Tawri et al. | |
| 8,417,828 B2 | 4/2013 | Ma et al. | |
| 8,443,062 B2 | 5/2013 | Voutilainen et al. | |
| 8,468,214 B1 | 6/2013 | Bourlas et al. | |
| 8,504,758 B1 | 8/2013 | McHugh et al. | |
| 8,561,115 B2 | 10/2013 | Hattori et al. | |
| 8,577,957 B2 | 11/2013 | Behar et al. | |
| 8,707,091 B2 * | 4/2014 | Gladwin .............. | G06F 12/1425 709/216 |
| 8,745,342 B2 | 6/2014 | Amano et al. | |
| 8,769,042 B2 | 7/2014 | Sedeffow | |
| 8,898,236 B2 | 11/2014 | Kanakadandi et al. | |
| 9,098,683 B2 | 8/2015 | Rose | |
| 9,225,780 B2 | 12/2015 | Braam et al. | |
| 9,367,448 B1 | 6/2016 | Botelho et al. | |
| 9,471,593 B1 | 10/2016 | Anderson et al. | |
| 2001/0034812 A1 | 10/2001 | Ignatius et al. | |
| 2001/0047400 A1 | 11/2001 | Coates et al. | |
| 2001/0048728 A1 | 12/2001 | Peng | |
| 2002/0042693 A1 | 4/2002 | Kampe et al. | |
| 2002/0059309 A1 * | 5/2002 | Loy .................. | G06F 16/148 |
| 2002/0073086 A1 | 6/2002 | Thompson et al. | |
| 2002/0103888 A1 | 8/2002 | Janz et al. | |
| 2002/0114341 A1 | 8/2002 | Sutherland et al. | |
| 2002/0124137 A1 * | 9/2002 | Ulrich .................. | G06F 3/0646 711/113 |
| 2002/0145786 A1 | 10/2002 | Chang et al. | |
| 2002/0156912 A1 | 10/2002 | Hurst et al. | |
| 2003/0026254 A1 | 2/2003 | Sim | |
| 2003/0065663 A1 | 4/2003 | Chu | |
| 2003/0097468 A1 | 5/2003 | Hamadi | |
| 2003/0120654 A1 | 6/2003 | Edlund et al. | |
| 2003/0126122 A1 | 7/2003 | Bosley et al. | |
| 2003/0154238 A1 | 8/2003 | Murphy et al. | |
| 2003/0172089 A1 | 9/2003 | Douceur et al. | |
| 2003/0177261 A1 | 9/2003 | Sekiguchi et al. | |
| 2003/0233455 A1 | 12/2003 | Leber et al. | |
| 2004/0010654 A1 | 1/2004 | Yasuda et al. | |
| 2004/0030787 A1 | 2/2004 | Jandel et al. | |
| 2004/0059805 A1 | 3/2004 | Dinker et al. | |
| 2004/0064729 A1 | 4/2004 | Yellepeddy | |
| 2004/0078466 A1 | 4/2004 | Coates et al. | |
| 2004/0088297 A1 | 5/2004 | Coates et al. | |
| 2004/0088646 A1 | 5/2004 | Yeager et al. | |
| 2004/0111730 A1 | 6/2004 | Apte | |
| 2004/0243675 A1 | 12/2004 | Taoyama et al. | |
| 2004/0260775 A1 | 12/2004 | Fedele | |
| 2005/0010618 A1 | 1/2005 | Hayden | |
| 2005/0015431 A1 | 1/2005 | Cherkasova | |
| 2005/0015461 A1 | 1/2005 | Richard et al. | |
| 2005/0038990 A1 | 2/2005 | Sasakura et al. | |
| 2005/0044092 A1 | 2/2005 | Adya et al. | |
| 2005/0055418 A1 | 3/2005 | Blanc et al. | |
| 2005/0114711 A1 | 5/2005 | Hesselink et al. | |
| 2005/0177550 A1 | 8/2005 | Jacobs et al. | |
| 2005/0193245 A1 | 9/2005 | Hayden et al. | |
| 2005/0204042 A1 | 9/2005 | Banerjee et al. | |
| 2005/0246393 A1 | 11/2005 | Coates et al. | |
| 2005/0256894 A1 | 11/2005 | Talanis et al. | |
| 2005/0278552 A1 | 12/2005 | Delisle et al. | |
| 2005/0283649 A1 | 12/2005 | Turner et al. | |
| 2006/0023969 A1 | 2/2006 | Lara et al. | |
| 2006/0031230 A1 | 2/2006 | Kumar | |
| 2006/0031439 A1 | 2/2006 | Saffre | |
| 2006/0047776 A1 | 3/2006 | Chieng et al. | |
| 2006/0080574 A1 | 4/2006 | Saito et al. | |
| 2006/0090045 A1 | 4/2006 | Bartlett et al. | |
| 2006/0090095 A1 | 4/2006 | Massa et al. | |
| 2006/0095397 A1 | 5/2006 | Torres et al. | |
| 2006/0112154 A1 | 5/2006 | Douceur et al. | |
| 2006/0218203 A1 | 9/2006 | Yamato et al. | |
| 2006/0253504 A1 | 11/2006 | Lee et al. | |
| 2006/0288053 A1 | 12/2006 | Holt et al. | |

(56) References Cited

U.S. PATENT DOCUMENTS

| | | |
|---|---|---|
| 2007/0022087 A1 | 1/2007 | Bahar et al. |
| 2007/0022121 A1 | 1/2007 | Bahar et al. |
| 2007/0022122 A1 | 1/2007 | Bahar et al. |
| 2007/0022129 A1 | 1/2007 | Bahar et al. |
| 2007/0028291 A1 | 2/2007 | Brennan et al. |
| 2007/0055703 A1 | 3/2007 | Zimran et al. |
| 2007/0088703 A1 | 4/2007 | Kasiolas et al. |
| 2007/0094269 A1 | 4/2007 | Mikesell et al. |
| 2007/0094354 A1 | 4/2007 | Soltis |
| 2007/0179981 A1* | 8/2007 | Vincent ............... G06F 3/0605 |
| 2007/0189153 A1 | 8/2007 | Mason |
| 2007/0192451 A1 | 8/2007 | Tran et al. |
| 2007/0198467 A1 | 8/2007 | Wiser et al. |
| 2007/0220320 A1 | 9/2007 | Sen et al. |
| 2007/0255763 A1 | 11/2007 | Beyerle et al. |
| 2007/0276838 A1 | 11/2007 | Abushanab et al. |
| 2007/0288494 A1 | 12/2007 | Chrin et al. |
| 2007/0288533 A1 | 12/2007 | Srivastava et al. |
| 2007/0288638 A1 | 12/2007 | Vuong et al. |
| 2008/0005195 A1 | 1/2008 | Li et al. |
| 2008/0005199 A1 | 1/2008 | Chen et al. |
| 2008/0010372 A1 | 1/2008 | Khedouri et al. |
| 2008/0043634 A1 | 2/2008 | Wang et al. |
| 2008/0077635 A1* | 3/2008 | Sporny ............... G06F 16/1834 |
| 2008/0084889 A1 | 4/2008 | Archer et al. |
| 2008/0104218 A1 | 5/2008 | Liang et al. |
| 2008/0104666 A1 | 5/2008 | Dillaway |
| 2008/0109830 A1 | 5/2008 | Giotzbach et al. |
| 2008/0126357 A1 | 5/2008 | Casanova et al. |
| 2008/0168157 A1 | 7/2008 | Marchand |
| 2008/0171556 A1 | 7/2008 | Carter |
| 2008/0172478 A1 | 7/2008 | Kiyohara et al. |
| 2008/0177767 A1 | 7/2008 | Lin et al. |
| 2008/0198752 A1 | 8/2008 | Fan et al. |
| 2008/0216174 A1 | 9/2008 | Vogel et al. |
| 2008/0235321 A1 | 9/2008 | Matsuo |
| 2008/0243950 A1 | 10/2008 | Webman et al. |
| 2008/0244674 A1 | 10/2008 | Hayashi et al. |
| 2008/0270822 A1 | 10/2008 | Fan et al. |
| 2009/0043922 A1 | 2/2009 | Crowther |
| 2009/0083810 A1 | 3/2009 | Hattori et al. |
| 2009/0132543 A1 | 5/2009 | Chatley et al. |
| 2009/0172211 A1 | 7/2009 | Perry et al. |
| 2009/0172307 A1 | 7/2009 | Perry et al. |
| 2009/0228669 A1 | 9/2009 | Slesarev et al. |
| 2009/0249222 A1 | 10/2009 | Schmidt et al. |
| 2009/0271412 A1 | 10/2009 | Lacapra et al. |
| 2009/0287842 A1 | 11/2009 | Plamondon |
| 2010/0057785 A1 | 3/2010 | Khosravy et al. |
| 2010/0070515 A1 | 3/2010 | Dutton et al. |
| 2010/0115078 A1 | 5/2010 | Ishikawa et al. |
| 2010/0146497 A1 | 6/2010 | Kogan et al. |
| 2010/0161138 A1 | 6/2010 | Lange et al. |
| 2010/0169391 A1 | 7/2010 | Baptist et al. |
| 2010/0169415 A1 | 7/2010 | Leggette et al. |
| 2010/0185693 A1 | 7/2010 | Murty et al. |
| 2010/0193888 A1 | 8/2010 | Blomstedt et al. |
| 2010/0193889 A1 | 8/2010 | Byers et al. |
| 2010/0223262 A1 | 9/2010 | Krylov et al. |
| 2010/0303071 A1 | 12/2010 | Kotalwar et al. |
| 2010/0306270 A1 | 12/2010 | McDiarmid et al. |
| 2011/0047413 A1 | 2/2011 | McGill et al. |
| 2011/0047620 A1 | 2/2011 | Mahaffey et al. |
| 2011/0055353 A1 | 3/2011 | Tucker et al. |
| 2011/0072206 A1 | 3/2011 | Ross et al. |
| 2011/0087690 A1 | 4/2011 | Cairns |
| 2011/0125814 A1 | 5/2011 | Slik et al. |
| 2011/0153557 A1 | 6/2011 | Bernstein et al. |
| 2011/0161335 A1 | 6/2011 | Dash et al. |
| 2011/0208825 A1 | 8/2011 | Lee et al. |
| 2011/0231374 A1 | 9/2011 | Jain et al. |
| 2011/0238909 A1 | 9/2011 | Kumar et al. |
| 2011/0252204 A1 | 10/2011 | Coon et al. |
| 2012/0066498 A1 | 3/2012 | Engert |
| 2012/0109883 A1 | 5/2012 | Iordanav et al. |
| 2012/0180070 A1* | 7/2012 | Pafumi ............... G06F 9/542 719/313 |
| 2012/0191771 A1 | 7/2012 | Preston et al. |
| 2012/0290870 A1 | 11/2012 | Shah et al. |
| 2012/0331021 A1 | 12/2012 | Lord |
| 2013/0031423 A1 | 1/2013 | Barrow et al. |
| 2013/0060884 A1 | 3/2013 | Bernbo et al. |
| 2013/0103851 A1 | 4/2013 | Umeki et al. |
| 2013/0133030 A1 | 5/2013 | Xue et al. |
| 2013/0254314 A1 | 9/2013 | Chow et al. |
| 2013/0268632 A1 | 10/2013 | Baron et al. |
| 2014/0006796 A1 | 1/2014 | Smith et al. |
| 2014/0173112 A1 | 6/2014 | Seago et al. |
| 2014/0289702 A1 | 9/2014 | McMahon et al. |
| 2014/0298135 A1 | 10/2014 | Dhuse et al. |
| 2015/0288659 A1 | 10/2015 | Lukacs |
| 2016/0099963 A1 | 4/2016 | Mahaffey et al. |

FOREIGN PATENT DOCUMENTS

| | | |
|---|---|---|
| EP | 0774723 | 7/1998 |
| EP | 0934568 | 6/2003 |
| EP | 1521189 | 4/2005 |
| EP | 1578088 | 9/2005 |
| EP | 1669850 | 6/2006 |
| EP | 1798934 | 6/2007 |
| EP | 2031513 | 3/2009 |
| JP | 06348527 | 12/1994 |
| JP | 11249874 | 9/1999 |
| JP | 2000322292 | 11/2000 |
| JP | 2003030012 | 1/2003 |
| JP | 2003223286 | 8/2003 |
| JP | 2003248607 | 9/2003 |
| JP | 2003271316 | 9/2003 |
| JP | 2004005491 | 1/2004 |
| JP | 2007058275 | 3/2007 |
| JP | 2008250767 | 10/2008 |
| JP | 2009259007 | 11/2009 |
| WO | 1999038093 | 7/1999 |
| WO | 2001018633 | 3/2001 |
| WO | 2002035359 | 5/2002 |
| WO | 2002044835 | 6/2002 |
| WO | 2004053677 | 6/2004 |
| WO | 2006124911 | 11/2006 |
| WO | 2007014296 | 2/2007 |
| WO | 2007115317 | 10/2007 |
| WO | 2007134918 | 11/2007 |
| WO | 2008069811 | 6/2008 |
| WO | 2008102195 | 8/2008 |
| WO | 2009048726 | 4/2009 |
| WO | 2010046393 | 4/2010 |
| WO | 2010080533 | 7/2010 |
| WO | 2011131717 | 10/2011 |

OTHER PUBLICATIONS

Deering, et al.,Muiticast Routing in Datagram Internetworks and Extended LANs, ACM Transactions on Computer Systems, vol. 8, No. 2, May 1990, pp. 85-110.

Gavrilov, et al.,Replication-Distributed Database and Data Warehouses, Lections, Available at <http://mai.pmoproject.ru/display/MSP/8.+Replication>, Nov. 20, 2006, 5 pages.

Handley, et al.,Session Directories and Scalable Internet Multicast Address Allocation, 1998.

Hewlett-Packard Development Comp, et al., HP Volume Shadowing for OpenVMS, OpenVMS Alpha 7.3-2, Sep. 2003, 162 pages.

ITU-T, et al.,Series C: Data Networks and Open System Communications—OSI Networking and System Aspects-Naming, Addressing and Registration, ITU-T Recommendation X.667, Sep. 2004, 34 pages.

Katsurashima, et al.,NAS Switch: a Novel CIFS Server Virtualization, Proceedings. 20th IEEE/11th NASA Goddard Conference on Mass Storage Systems and Technologies, Apr. 7-10, 2003, pp. 82-86.

Kronenberg, et al.,VAXclusters: A Closely-Coupled Distributed System, ACM Transactions on Computer Systems, vol. 4, No. 2, May 1986, pp. 130-146.

(56) References Cited

OTHER PUBLICATIONS

Lan, et al.,Consistency Maintenance in Peer-to-Peer File Sharing Networks, Proceedings the Third IEEE Workshop on Internet Applications, Jun. 23-24, 2003, 11 pages.

Parris, et al.,Using OpenVMS Clusters for Disaster Tolerance, System/Software Engineer, HP Services-Systems Engineering, 2003, 27 pages.

SAP Library, et al.,Queues for Prioritized Message Processing, SAP Exchange Infrastructure, Available online at http://help.sap.com/saphelp_nw04/helpdata/en/04/827440c36ed562e10000000a155106/content.htm, Feb. 6, 2009, pp. 1-2.

squid-cache.org, et al.,Squid Configuration Directive Reply_Body_Max_Size, Available online at http://www.squid-cache.org/Doc/config/reply_body_max_size/, Dec. 21, 2008, pp. 1-2.

Suryanarayanan, et al.,Performance Evaluation of New Methods of Automatic Redirection for Load Balancing of Apache Servers Distributed in the Internet, Proceedings. 25th Annual IEEE Conference on Local Computer Networks, Nov. 8-10, 2000, pp. 644-651.

Tang, et al.,An Efficient Data Location Protocol for Self-Organizing Storage Clusters, Supercomputing, ACM/IEEE Conference, Phoenix, AZ, USA, Nov. 15-21, 2003, 13 pages.

Trustwave, et al.,How Do I Block Large Files by Content Size Before Download?, Available online at https://www.trustwave.com/support/kb/article.aspx?id=13166, Mar. 23, 2009, pp. 1-2.

Weatherspoon, et al.,Antiquity: Exploiting a Secure Log for Wide-Area Distributed Storage, Proceedings of the EuroSys Conference, ACM 2007, Lisbon, Portugal, Mar. 21-23, 2007, pp. 371-384.

Wikipedia, et al.,FastTrack, Available online at http://de.wikipedia.org/w/index.php?title=FastTrack&01did=83614953, Jan. 8, 2011, pp. 1-2.

Wikipedia, et al.,Load Balancing (Computing), Available online at http://en.wikipedia.org/w/index.php?title=Load_balancing_%28computing%29&01did=446655159, Aug. 25, 2011, pp. 1-7.

Wikipedia, et al., Universally Unique Identifier, Available at https://en.wiki~eclia.orq/wiki/Universall'1unigue identifier, Aug. 24, 2011, 9 pages.

Zhang, et al.,Brushwood: Distributed Trees in Peer-to-Peer Systems, Peer-to-Peer Systems IV Lecture Notes in Computer Science vol. 3640, 2005, pp. 1-6.

* cited by examiner

VIRTUAL FILE STRUCTURE FOR DATA STORAGE SYSTEM

RELATED APPLICATIONS

This application is a continuation of U.S. patent application Ser. No. 15/941,774, filed Mar. 30, 2018, which is a continuation of U.S. patent application Ser. No. 14/997,098, filed Jan. 15, 2016, which is a continuation of U.S. patent application Ser. No. 14/098,021, filed Dec. 5, 2013, now U.S. Pat. No. 9,305,012, which is a continuation of U.S. patent application Ser. No. 13/224,415, filed Sep. 2, 2011, now U.S. Pat. No. 8,645,978. The contents of each of these applications are hereby incorporated by reference in their entireties.

This application includes subject matter that may be related to subject matter included in the following applications: U.S. patent application Ser. No. 13/224,393 entitled "A Method And Device For Maintaining Data In A Data Storage System Comprising A Plurality Of Data Storage Nodes," filed Sep. 2, 2011; U.S. patent application Ser. No. 13/224,404 entitled "Method And Device For Writing Data In A Data Storage System Comprising A Plurality Of Data Storage Nodes," filed Sep. 2, 2011; U.S. patent application Ser. No. 13/224,424 entitled "Method For Handling Requests In A Storage System And A Storage Node For A Storage System," filed Sep. 2, 2011; U.S. patent application Ser. No. 13/224,433 entitled "Method For Data Retrieval From A Distributed Data Storage System," filed Sep. 2, 2011; and U.S. patent application Ser. No. 13/224,446 entitled "Method For Updating Data In A Distributed Data Storage System," filed Sep. 2, 2011.

BACKGROUND

Such a method is disclosed in US Patent Publication No. 2005/0246393 A1. This method is disclosed for a system that may use a plurality of storage centers at geographically disparate locations. Distributed object storage managers may be included to maintain information regarding stored data. One problem associated with such a system is how to accomplish simple and yet robust and reliable maintenance of data.

BRIEF DESCRIPTION OF THE DRAWINGS

The above, as well as additional objects, features and advantages of the disclosed embodiments, may be better understood through the following illustrative and non-limiting detailed description, with reference to the appended drawings, where the same reference numerals may be used for similar elements.

DETAILED DESCRIPTION

Figure 1:
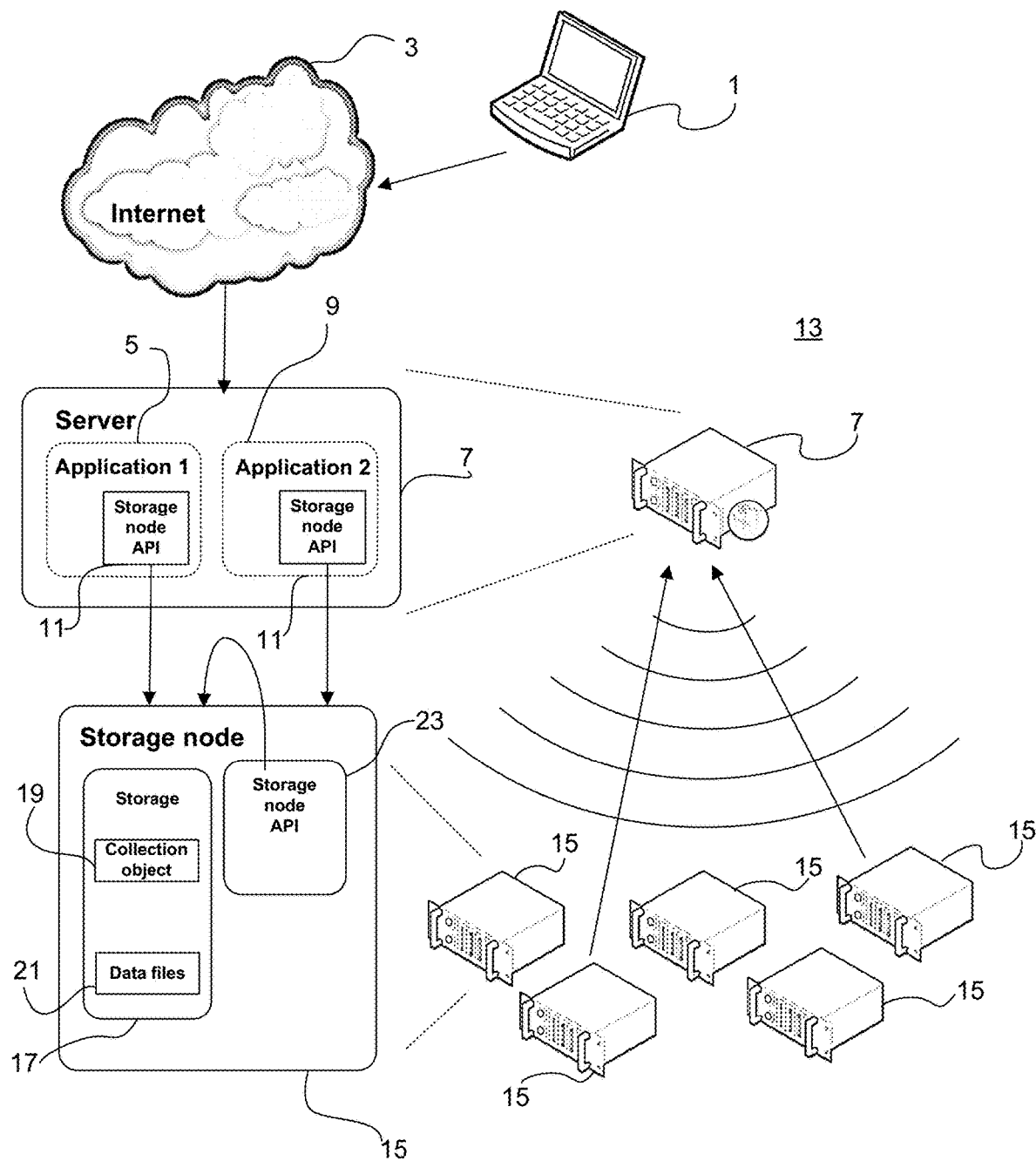
FIG. 1 is a schematic view of an example storage system.

A method to maintain data in a data storage system comprising data storage nodes interconnected by means of a communications network is disclosed. The method may include sending a request for a first data item to a plurality of storage nodes. The first data item may include a reference to a second data item stored in the storage system. The method may also include receiving the first data item from at least one storage node, and/or sending a request for the second data item to the plurality of storage nodes, for example based on the reference included in the first data item.

In an embodiment, a virtual directory structure may be implemented in a storage system where the files are stored in an unstructured manner.

The request for the first and second data entities may be sent by multicast.

For example, by utilizing multicast many storage nodes may be easily accessed.

The first and second data items may be identified by a first and second unique key.

In an embodiment, the files in the storage system may be accessed directly irrespective of their location in the system.

The first and second unique key may include a cluster address pointing out a subset of said storage nodes within the system, and/or a data item identifier identifying a data item within the subset of storage nodes. A reference to a data item may include the unique key.

In an embodiment, the method may be implemented in large storage systems, for example a storage system which include hundreds or thousands of storage nodes.

The method may comprise sending the first and second request from an application programming interface, API.

For example, by utilizing a common API to access the storage nodes, the method may be easily implemented on many different platforms.

The API may be implemented on a server in communication with the storage nodes.

In an embodiment, the method may be implemented on a dedicated device provided e.g. by a third party which may not be responsible for the maintenance of the storage nodes.

The API may be implemented in a storage node.

In an example embodiment, implementing the API in a storage node may allow the number of access points into the storage system may be increased.

The method may comprise the API retrieving the unique key, identifying the second data item, from the received first data item.

For example, the unique identifier for the second data item may be easily retrievable if an indication of the unique identifier is included in the first data item.

The method may comprise receiving the key, identifying the first data item, in the API.

In an embodiment, one or more directory structures may be implemented simultaneously.

The second data item may include a reference to third data item.

For example, in an embodiment directory structures with multiple levels may be implemented.

The second data item may include payload data, such as an image.

For example, data files with payload data may be part of the directory structure (e.g. stored in sub folders).

The first data item may be sent by unicast.

For example, by utilizing unicast, the data item may be transferred in a bandwidth effective manner.

According to an embodiment, a method for maintaining data in a data storage system including data storage nodes interconnected by means of a communications network may be implemented in a server and/or a data storage node. The method may include storing a first data item in at least one storage node. The method may also include updating a second data item, stored in at least one storage node. For example, the second data item may be updated by adding a reference to the first data item in the second data item. Updating the second data item may include sending a request to at least one storage node that stores a copy of the second data item. The request may instruct and/or request that the at least one storage node add a reference to the first data item to the second data item.

In an embodiment, new items may easily be added to the directory structure, for example by adding references to the new items to other items in the directory structure.

According to an embodiment, a method for maintaining data may be implemented a server or data storage node included in a data storage system. The data storage nodes may be interconnected by means of a communications network. The method may include deleting a first data item stored in at least one storage node. The method may also include updating a second data item, stored in at least one storage node, by deleting a reference to the second data item in the second data item.

In an example embodiment, items in the directory structure may easily be deleted, for example by deleting references to the items.

According an embodiment, a data storage system may include data storage nodes interconnected by means of a communications network. A server or node may include an application programming interface, API, and may be configured to send a request for a first data item to a plurality of storage nodes. The first data item may include a reference to a second data item stored in the storage system. At least one storage node may be configured to send the first data item to the API. The API and/or storage node or sever may be further configured to send a request for a second data item to the plurality of storage nodes based on the reference included in the first data item.

For example, a virtual directory structure may be implemented in a storage system where the files are stored in an unstructured manner.

Other objectives, features and advantages of the disclosed embodiments may appear from the following detailed disclosure, from the attached claims as well as from the drawings.

Generally, all terms used in the claims are to be interpreted according to their ordinary meaning in the technical field, unless explicitly defined otherwise herein. All references to "a/an/the" are to be interpreted openly as referring to at least one instance of said element, device, component, means, step, etc., unless explicitly stated otherwise. The steps of any method disclosed herein do not have to be performed in the exact order disclosed, unless explicitly stated.

Detailed embodiments of the disclosed methods and systems may be described with reference to the drawings. The present disclosure is related to a distributed data storage system comprising a plurality of storage nodes. An example structure of the system and the context in which it may be used is outlined in FIG. 1.

A user computer 1 may access, for example via the Internet 3, an application 5 running on a server 7. The user context, as illustrated here, may be therefore a client-server configuration. However, it should be noted that the data storage system to be disclosed may be useful also in other configurations, for example utilizing other communication methods.

In the illustrated case, two applications 5, 9 may run on the server 7. Of course however, any number of applications may be running on server 7. Each application may have an API (Application Programming Interface) 11 which may provide an interface in relation to the distributed data storage system 13 and may support requests, typically write and read requests, from the applications running on the server. Data may be read and written to the storage system using the methods described in detail in U.S. patent application Ser. No. 13/125,524, filed Apr. 21, 2011, the contents of which are hereby incorporated by reference herein. Methods of reading and writing of data therefore may not be further elaborated upon in detail herein. From an application's point of view, reading or writing information from/to the data storage system 13 may appear to be the same as using any other type of storage solution, for instance a file server or a hard drive.

Each API 11 may communicate with storage nodes 15 in the data storage system 13, and the storage nodes may communicate with each other. Alternatively, or additionally, one or more of the storage nodes 15 may include an API 23 for supporting requests as disclosed above. These communications may be based on TCP (Transmission Control Protocol) and UDP (User Datagram Protocol). Other communication protocols may also be utilized.

The components of the distributed data storage system may be the storage nodes 15 and the APIs 11 in the server 7 which may access the storage nodes 15. The present disclosure may be described in relation to methods carried out in the server 7 and in the storage nodes 15. Those methods may be primarily be embodied as combination software/hardware implementations which are executed on the server and the storage nodes, respectively. The operations of the server and/or storage nodes may together determine the operation and the properties of the overall distributed data storage system.

Although in FIG. 1 the server 7 is illustrated as a member of the storage system 13 which is separate from the storage nodes 15 it should be noted that the server 7 may be a storage node including server functionality.

The storage node 15 may typically be embodied by a file server which is provided with a number of functional blocks. The storage node may thus include a storage medium 17, which for example may include a number of internal (e.g. connected via Integrated Drive Electronics (IDE), Serial Advanced Technology Attachment (SATA), and/or the like) or external hard drives (e.g. connected via Universal Serial Bus (USB), Firewire, Bluetooth, and/or the like), optionally configured as a RAID (Redundant Array of Independent Disk) system. Other types of storage media are however conceivable as well.

Each storage node 15 may contain a node list including the IP addresses of all storage nodes in its set or group of storage nodes. The number of storage nodes in a group may vary from a few to hundreds or thousands of storage nodes.

The storage medium 17 may store one or more data items 19, 21 in the form of collection objects 19 or payload data in the form of data files 21. A collection object 19 may include a set of references. A reference may be a reference to one or more data files stored in the storage system, e.g. data files 21. A reference may also be a reference to another collection object 19 stored in the storage system. A reference may include a pointer (e.g. a memory address) to a storage location of a storage node 15. A reference may include an identifier of the collection object or data file referred to.

As will be disclosed in more detail below, the collection object 19 may be used for implementing a structured layer in the storage system. Data files 21 referenced in the collection object 19 may in such an implementation represent data files stored in the structure. Additional collection objects 19 referenced in the collection object 19 may in such an implementation represent subdirectories stored in the directory.

A collection object 19 may be embodied as a data object having a predetermined format. The data object may be a special file in the file system of the storage medium 17 in the sense that it may be a binary file to be interpreted by the API. In an example, the data object may be a standard data file in the file system of the storage medium 17; the data object may e.g. be a plain text file indicating the referenced collection objects 19 and/or data files 21. A data object may be readable using the same routines of the file system as the data files 21.

Figure 2:
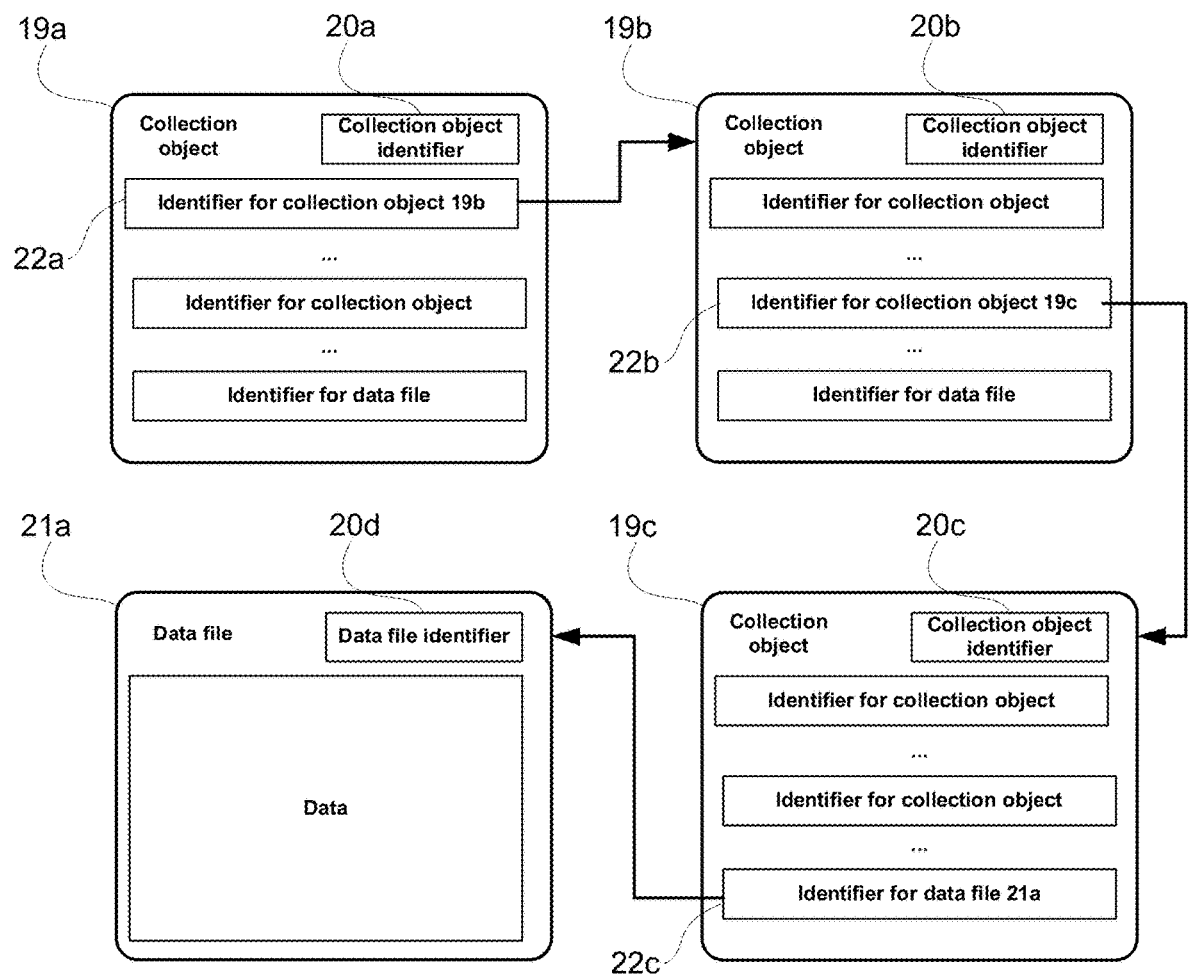
FIG. 2 is an example schematic block diagram of a number of data items stored in the storage system.

FIG. 2 schematically illustrates a collection object 19*a* according to one embodiment. The collection object 19*a* may have an associated collection object identifier 20*a*. The identifier 20*a* may for instance be a Universally Unique Identifier (UUID). The collection object identifier 20*a* may be included in a header of the collection object 19*a*. However, the collection object identifier 20*a* may be stored in a register maintained at the storage node 15, for example rather than being included in the collection object 19*a*. In an example, the UUID and/or the register maintained at storage node 15 may associate the collection object 19*a* with the collection object identifier 20*a*, e.g. by pointing out the memory address where the collection object 19*a* is to be found. Thus, the collection object 19*a* may form a first data item which is identified by a first unique key.

The collection object 19*a* may include a field 22*a* with an identifier 20*b* of another collection object 19*b*, e.g. in the form of a string. The collection object 19*a* may include a reference to the collection object 19*b*. The collection object 19*b* may be stored on the same storage node as the collection object 19*a* or on another storage node than the collection object 19*a*. The storage system may use the identifier 20*b* in the field 22*a* to locate and access the collection object 19*b*. Thus, the collection object 19*b* may form a second data item which is identified by a second unique key.

Figure 3:
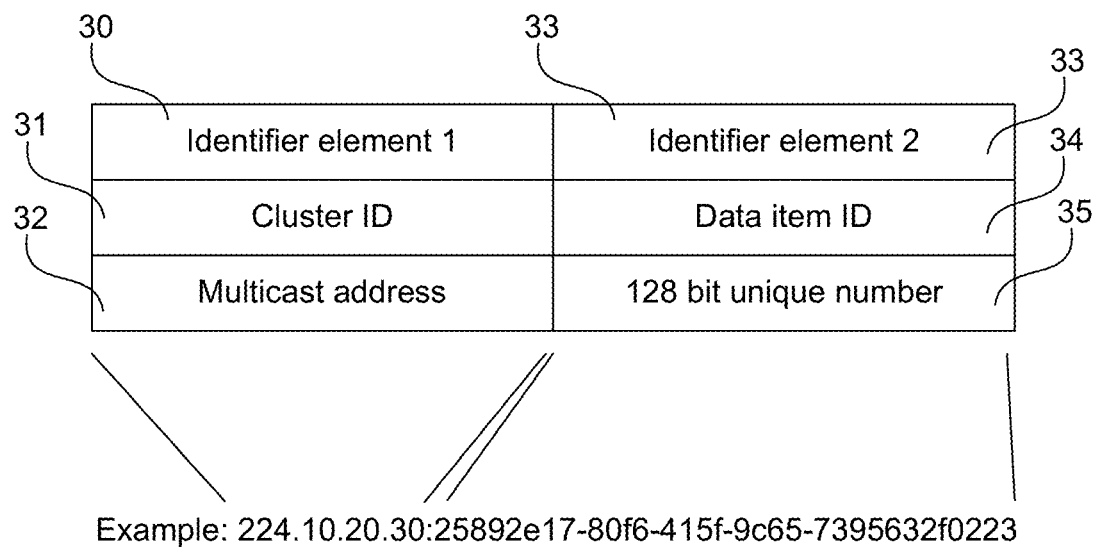
FIG. 3 is a schematic block diagram of an example data item identifier.

In one embodiment, in order to implement large storage systems spanning over multiple networks, the data item identifiers 20*a-d* may include two data elements. With reference to FIG. 3, the first data element 30 may be a cluster ID 31 that may identify the cluster where the data item (collection object 19*a-c* or data file 21*a*) is located. The cluster address may be a multicast address 32. The multicast address 32 may be utilized by the API to send a request for a data item to a specific cluster. The second data element 33 may be a data item ID 34 formed by a unique number 35 that identifies the data item 19*a-d* inside the cluster. The unique number 35 may be a number of with a defined length, e.g. 128 bits, or the length may vary. The unique number 35 may include a large number of bits, enabling a large number of data items to be uniquely identified within the cluster. By this arrangement a collection element in one cluster may reference another collection element or data file in another cluster. In other words, the first and second unique key may include a cluster address pointing out a subset of the storage nodes within the system, and a data item identifier identifying a data item within the subset of storage nodes.

Referring back to FIGS. 1 and 2, the server 7 may for example include a register indicating a storage node 15 storing the collection object (e.g. collection object 19*a*) associated with a specific identifier (e.g. identifier 20*a*). In another example, the collection object 19*a* may be located using the read method disclosed in U.S. patent application Ser. No. 13/125,524. Briefly, according to this read method the server 7 or a storage node 15 may send a multicast message to the plurality of storage nodes 15. The multicast message may include the identifier 20*a* of the desired collection object 19*a*. Each storage node 15, in response to receiving the multicast message, may scan its storage medium 17 for a collection object having said identifier. If found, the storage node 15 may respond and indicate that it stores the object sought-after to the originator of the multicast message. The collection object 19*a* may then be accessed by means of a unicast request sent to a responding storage node 15 storing the collection object 19*a*.

According to the present embodiment, multicast communication may be used to communicate simultaneously with a plurality of storage nodes. By a multicast or IP multicast is here meant a point-to-multipoint communication which may be accomplished by sending a message to an IP address which may be reserved for multicast applications. For example, a message, for example a request, may be sent to such an IP address (e.g. 244.0.0.1), and a number of recipient servers may be registered as subscribers to that IP address. Each of the recipient servers may have its own IP address. When a switch in the network receives the message directed to 244.0.0.1, the switch may forward the message to the IP addresses of each server registered as a subscriber.

In principle, a single server may be registered as a subscriber to a multicast address, in which case a point-to-point communication may be achieved. However, in the context of this disclosure, such a communication may nevertheless be considered a multicast communication since a multicast scheme is employed.

According to the present embodiment, unicast communication may refer to a communication with a single recipient. A unicast communication may be initiated by a party of the network and may be directed to a single specific recipient.

In addition to the collection object 19*a*, the collection object 19*b* may include a field 22*b* with an identifier 20*c* of a third collection object 19*c*. The collection object 19*c* may include a field 22*c* with an identifier 20*d* of a data file 21*a*. In other words, anyone of the collection objects 19*a-c* (or, for example, each of the collection objects 19*a-c*) may represent a second data item including a reference to third data item, and the data file 21*a* may represent a second data item including payload data, for example an image.

By appointing the collection object 19*a* as a root collection object, the collection object 19*a* may represent a root directory 19*a* of the storage system. Analogously the collection object 19*b* may represent a subdirectory 19*b* of the root directory 19*a*. The collection object 19*c* may represent a subdirectory of the subdirectory 19*b*. The data file 21*a* may represent a data file stored in the subdirectory 19*c*. The collection objects 19*a-c* may thus define a hierarchical storage structure. The structure may be referred to as a directory tree.

With reference to FIGS. 4 and 5*a-c*, a method for parsing a directory structure in order to access a file 19, 21 stored in a storage node 15 may be disclosed.

The starting point of the directory structure may be a predefined root key. For example, any of the storage nodes 15 may include a root key. This key may be stored outside of the storage cluster and may be used to identify the first data item (e.g. collection object 19*a*) in the directory structure. A storage cluster may have multiple root keys that enable the user to have multiple individual directory structures stored within the same storage cluster. The directory structures may span over several storage clusters. The root key may be stored together with external information describing the directory structure stored within the cluster.

In block 40, the server 7 may receive the root key, which may identify the first data item 19, 21 and may pass the unique identifier to identify the file within the storage system to the API 11. In an example, the API 23 may be implemented in a storage node 15, wherein the root key may be received in the storage node 15 rather than in the server 7.

In block 41, the API 11 in the server 7 may multicast a request for the data item (e.g. the collection object 19*a*) identified by the root key to storage nodes 15*a-e* in the storage system, or to a subset of the nodes. For example, the multicast message may be sent to a specific cluster, for example using the data item identifier configuration disclosed in relation to FIG. 3. According to one embodiment the data item (e.g. the collection object 19*a*) identified by the root key may be a special data item in the sense that it may include additional metadata which may be used by the system. Examples of such data may be information regarding access permissions to the items in the directory structure, information where to store certain data items (e.g. on a storage node with quick access such as an Solid State Drive (SSD)), and the like.

In block 42, storage node 15*a-e*, in response to receiving the multicast message, may scan their respective storage mediums 17 in an attempt to locate the data item identified by the data item ID 34 in the root key.

For purposes of illustration, it may be assumed in this example that nodes 15*b* and 15*e* locate the data item identified by the data item ID 34. In block 43, the nodes 15*b*, 15*e* that find the data item may reply with information about what other nodes 15*b*, 15*d*, 15*e* may contain the data item and the current execution load (e.g. how busy the nodes are, how many request the nodes received, how much free space is on the node, etc.) in the node 15*b*, 15*e*. The requested data item may be stored in a plurality of storage nodes 15*b*, 15*d*, 15*e*, wherein the API may collect the information received from the nodes 15*b*, 15*d*, 15*e* and may wait until it has received answers from more than 50% of the listed storage nodes 15*b*, 15*d*, 15*e* that contains the data item before it may make a decision on which one to select for the retrieval of the data item. The decision may be based on which node that has the lowest execution load.

In block 44 the API 11 may send a unicast request for the specific file to the chosen storage node. In this example, for purposes of illustration it may be assumed store node 15*b* is chosen. API 11 may retrieve the data item from the storage node 15*b*. The API 11 may maintain a list of all storage nodes 15*b*, 15*d*, 15*e* that store copies of the file in the event of a read or communication failure with the selected node 15*b*. If an error occurs the API 11 may transparently select the next best node in the list and continues the read operation.

In block 45 the API may interpret the content of the retrieved data item. If the directory structure comprises additional levels the retrieved data item may be a collection object 19*b*. If so, the API 11 may read the field 22*b* which may include an identifier 20*b* referring to another collection object 19*c* in the directory structure. For example, the API may retrieve the unique key, i.e. the identifier 20*b*, identifying the second data item, e.g. the collection object 19*b*, from the received first data item, e.g. the collection object 19*a*. The process may then return to block 41 and may continue parsing the directory structure. Thus, both the first and second request may be sent from an application programming interface, API. The process may continue until the last object in the directory structure has been identified and retrieved, e.g. the data file 21*a* whereupon the process may end at 46. In another example, the API 11 may send an update request to the identified object, e.g. a command to alter or concatenate data in the data item corresponding to the object in the directory structure.

As an example, it may be that the data file 21 is located in the root of the directory structure. In such a case the process may be looped a single time, since the first retrieved collection object 19*a* may contain a reference to the data file 21*a*. It is emphasized that the retrieved collection object in addition to including the reference to the data file 21*a* may also include references to other data items, such as collection object 19*b*.

Thus, according to the above, a method may implemented in a data storage system including data storage nodes interconnected by means of a communications network for accessing file. The method may include sending a request for a first data item 19, 21, (e.g. collection object 19*a*), to a plurality of storage nodes 15*a-e*. The first data item may include a reference to a second data item (e.g. data file 21*a* or collection object 19*b*), stored in the storage system. The method may include receiving the first data item from at least one storage node 15*b*, and sending a request for the second data item to the plurality of storage nodes 15*a-e* based on the reference included in the first data item.

As an illustrative example, with reference to FIG. 2, the API may recursively read and interpret referenced envelopes to resolve a path in a directory structure. For example, the API may identify an unstructured key that represents a file in the structured path. For example, a user accessing the storage system may want to resolve the path: "/Documents/Sample_Pictures/Blue_Hills.jpg".

In FIG. 2, collection object 19*a* may represent the root key "I" (identified by the unique key 20*a*) and the identifier 22*a* may include a reference to collection object 19*b* representing the folder "Documents/" (identified by the unique key 20*b*). The identifier 22*b* in the collection object 19*b* may include a reference to collection object 19*c* representing the folder "Sample_Pictures/". Finally, the identifier 22*c* in the collection object 19*c* may include a reference to the data file 21*a* comprising the payload data for the file "Blue_Hills.jpg". Thus, by recursively reading the references in the collection objects a virtual file structure may be created in an unstructured storage system.

With reference to FIGS. 6 and 5*a-c*, a method for parsing a directory structure in order to create a file 19, 21 in a storage node 15 is disclosed.

Figure 4:
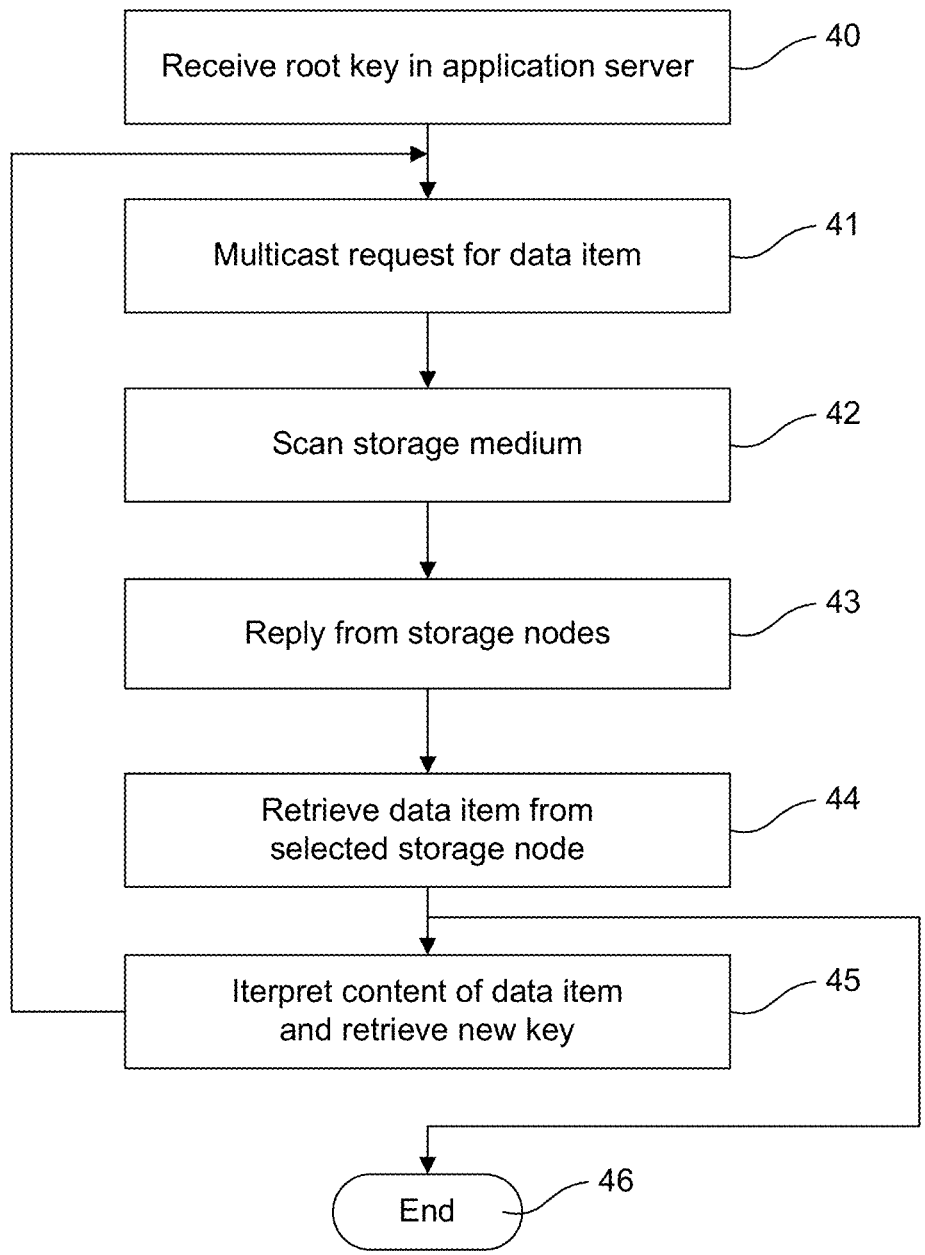
FIG. 4 is a schematic block diagram of an example method for retrieving data.
Figure 5A:
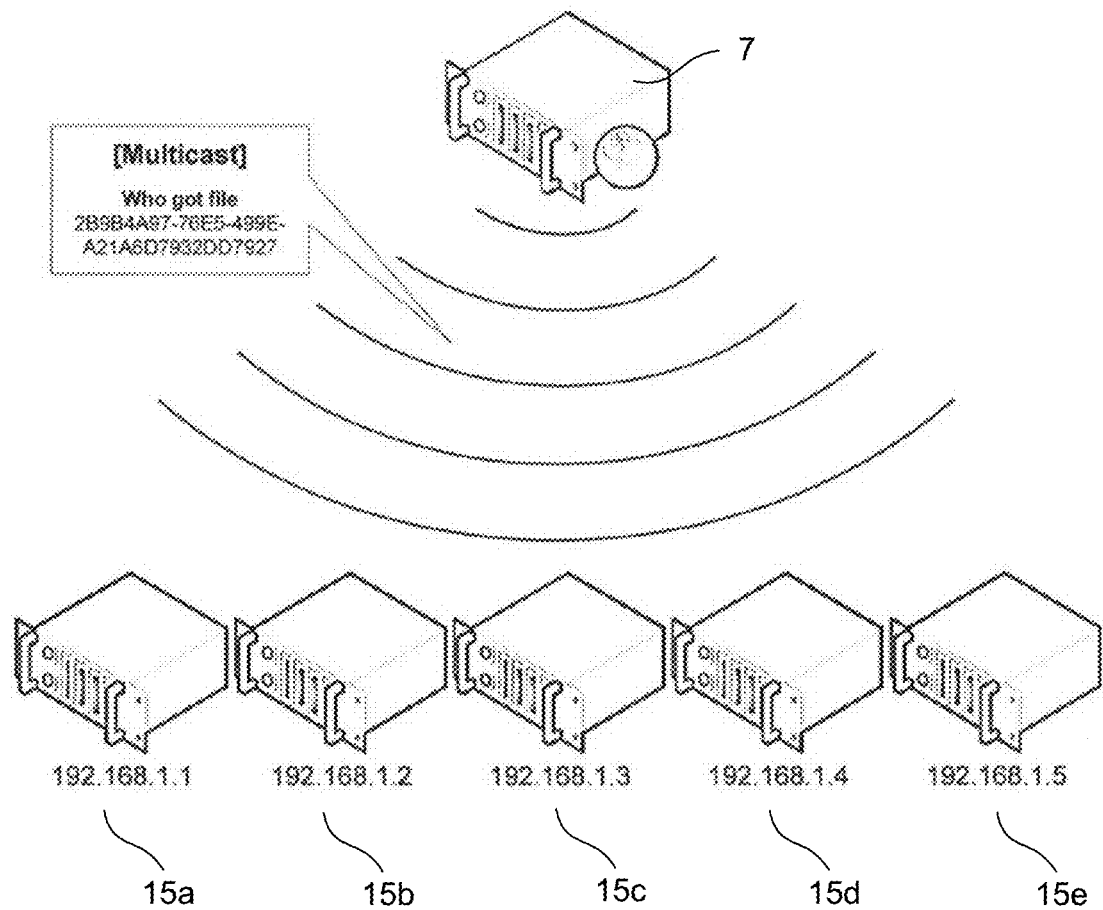
FIG. 5a-c are illustrations of example communications between different entities in the storage system.
Figure 5B:
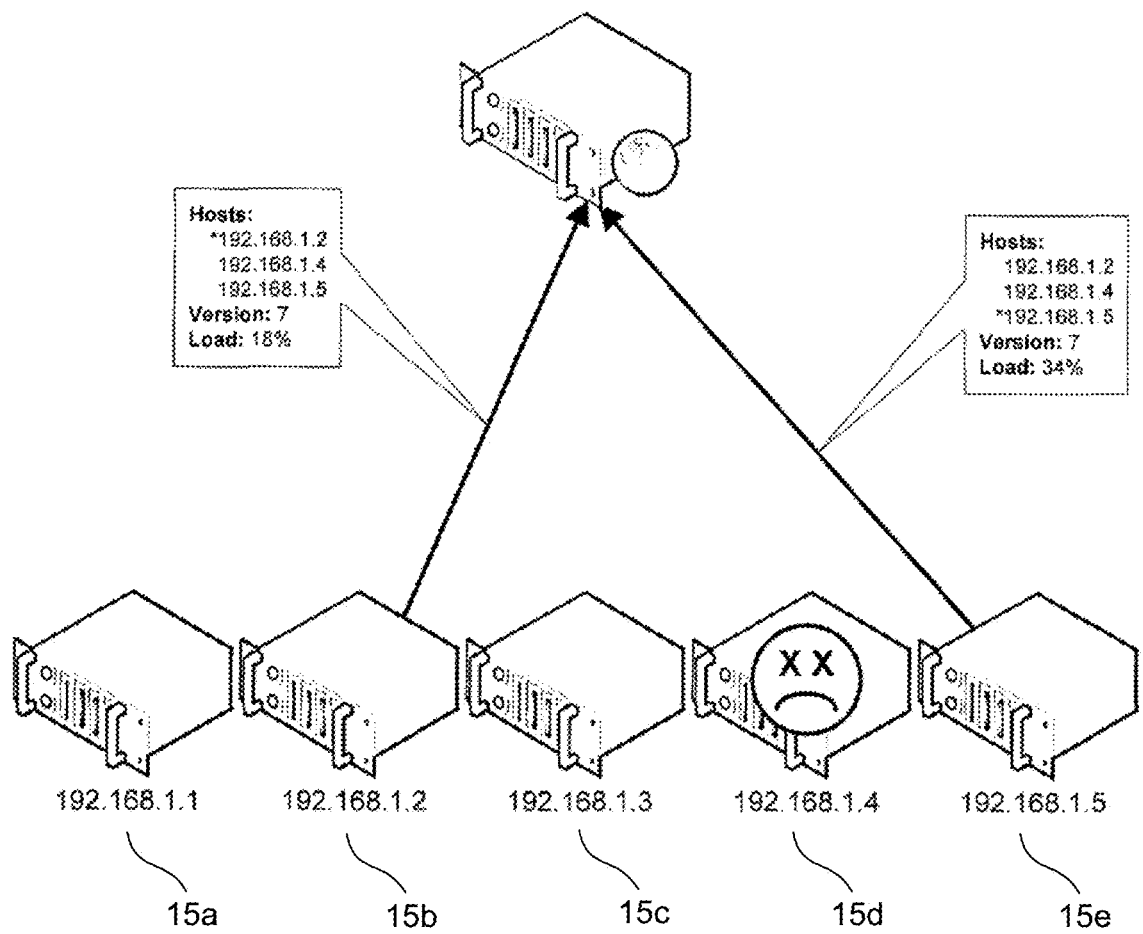
Figure 5C:
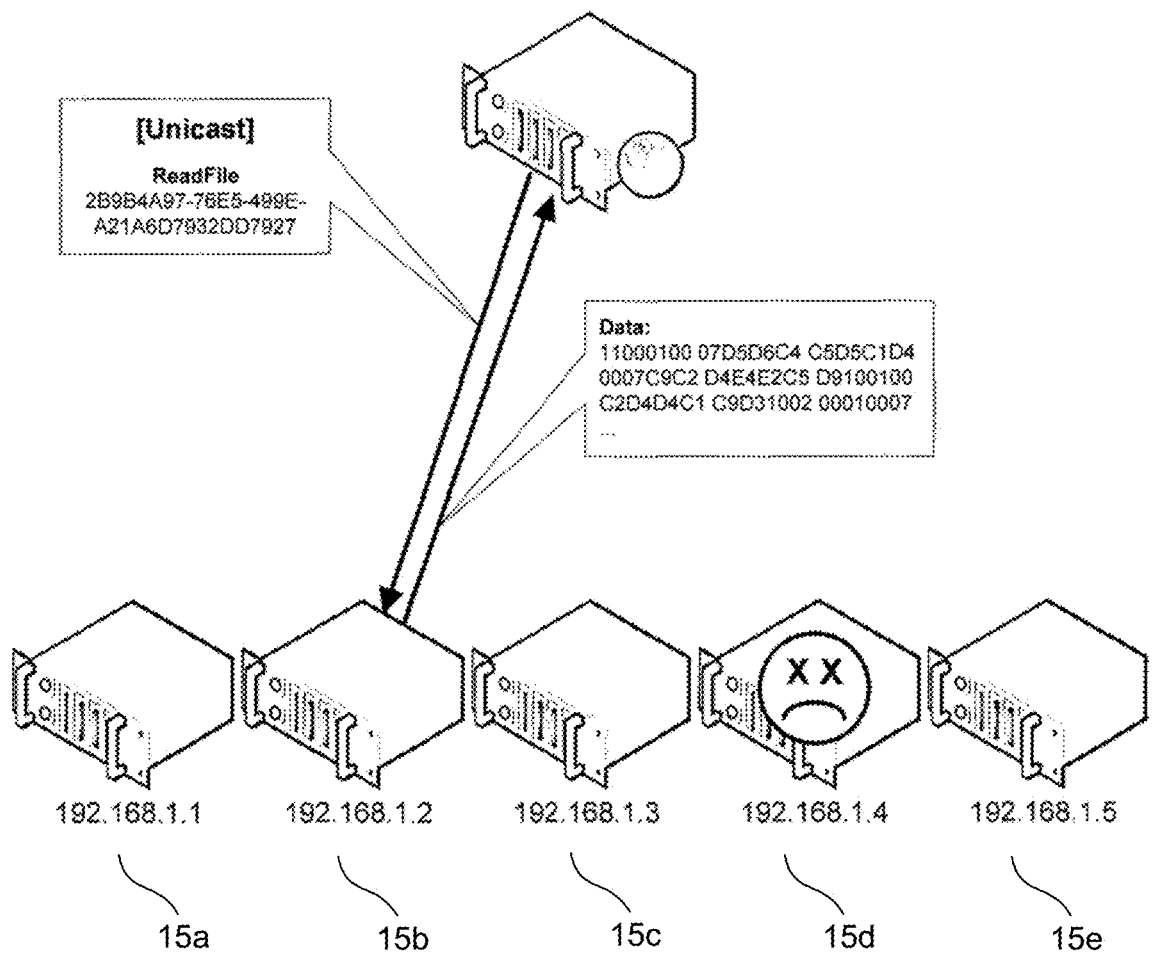
Figure 6:
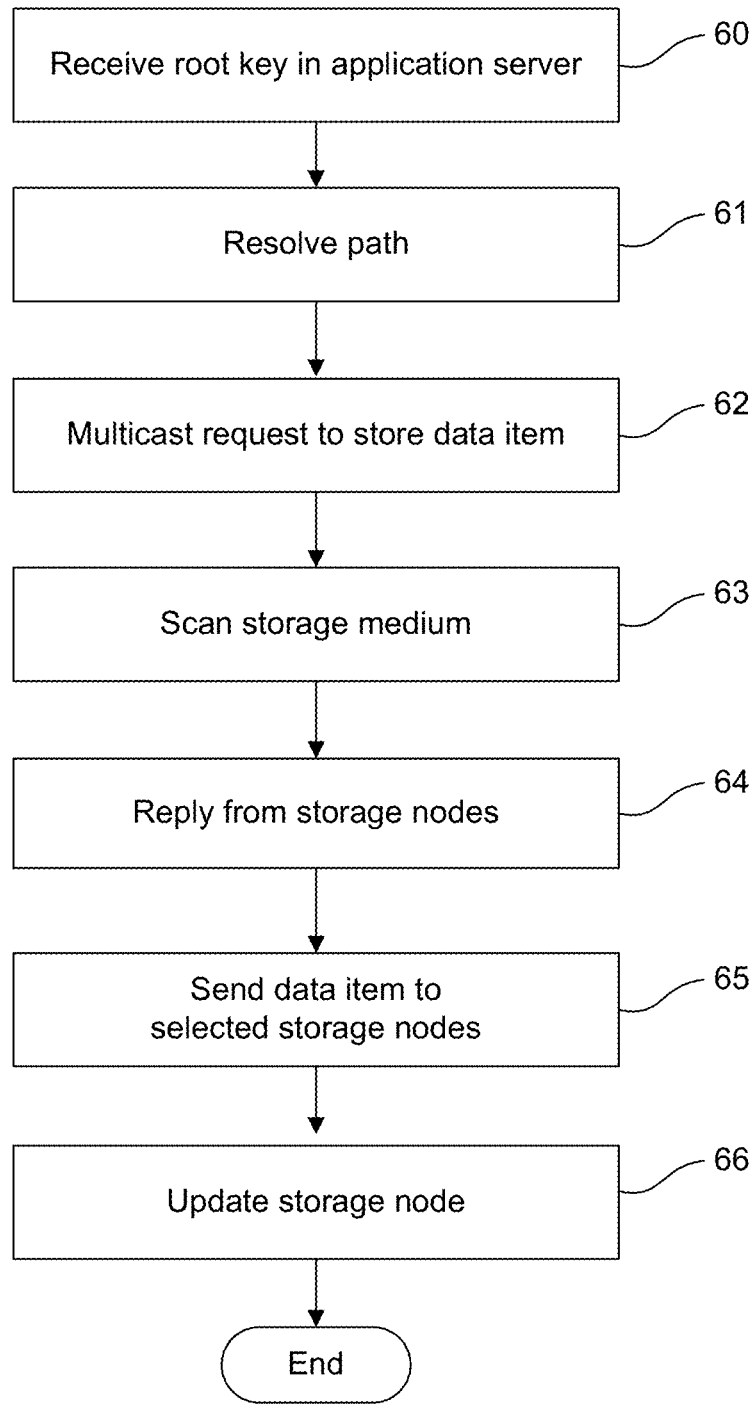
FIG. 6 is a schematic block diagram of an example method for storing data.
Figure 7:
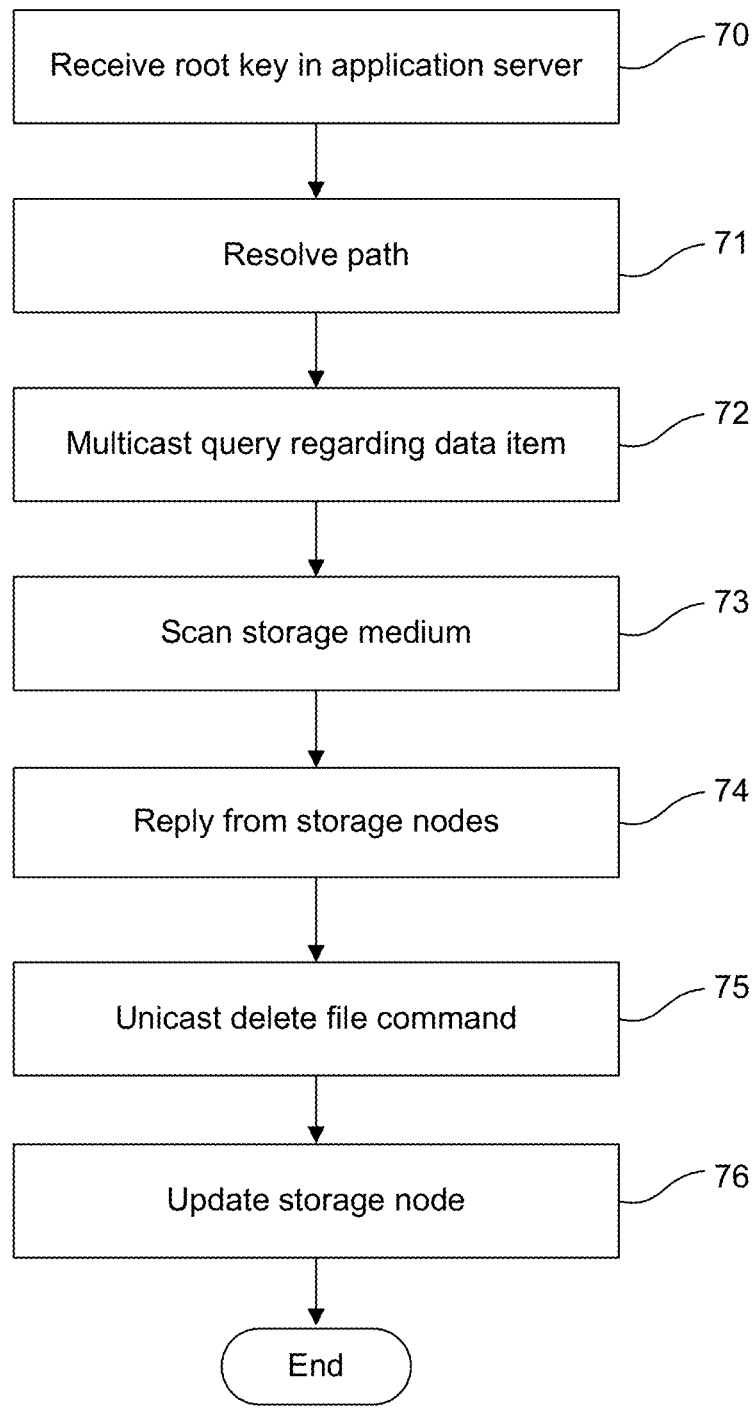
FIG. 7 is a schematic block diagram of an example method for deleting data.

Similarly to the system discloses in FIG. 4, the starting point of the directory structure is a predefined root key. The root key may be an arbitrary key, and there may be many root keys throughout the system. This key may be stored outside of the storage cluster and may be used to identify the first data item (e.g. collection object 19*a*) in the directory structure.

In block 60, the server 7 may receive the root key, and may pass the unique identifier to identify the file within the storage system to the API.

In block 61, the API 11 may resolve the path to the desired data item according to the method above.

In block 63, the API 11 in the server 7 may multicast a request for storing the data item (e.g. the collection object 19*c*) including the identifier to all storage nodes 15*a-e* in the storage system, or to a subset of the nodes, e.g. within a specific cluster, for example using the data item identifier configuration disclosed in relation to FIG. 3.

In block 63, storage nodes 15 *a-e*, in response to receiving the multicast message, may verify that the data item ID 34 is not already in use.

In block 64, a storage node which 15 *a-e* that fails to find an existing file with that specific identifier may reply with an acknowledgment that may indicate: free storage space on the storage node, an indication of the age of the hardware that the storage node is running on, current CPU load and/or the geographical position of the storage node 15 *a-e* in the form of latitude, longitude and altitude or the like.

In block 65 the API 11 may select three storage nodes (e.g. storage nodes 15*a*, 15*b* and 15*e*) based on the data returned from storage nodes that responded to the multicast request. When the three most suitable nodes have been selected the API 11 may send a request to the three nodes simultaneously to store the data item. If an error occurs during the transfer of the data item to one of the selected nodes 15*a*, 15*b*, 15*e*, the operation continues, for example as long as more than 50% of the selected nodes are operational.

In block 66 the identifier field 22*b* in the data item one level higher up in the directory structure (e.g. the first data item—the collection object 19*b*) may be updated with a reference to the stored data item (e.g. the collection object 19*c*), either by retrieving the first data item according to the read method according to the above or by accessing the first data item directly, for example if the server has cached the identifier of the first data item.

In order to increase the data integrity in the system the method above may be supplemented with the act of, prior to storing the data item, retrieving the first data item in case the communication with all storage nodes should be lost after the data item has been stored but before the first data item is updated. By this procedure the API may resume the update procedure once the communication with the storage nodes is resumed.

Thus, according to the above, a method may be implemented in various devices within a data storage system including data storage nodes interconnected by means of a communications network. The method may include storing a first data item in at least one storage node, and updating a second data item, stored in at least one storage node, by adding a reference to the first data item in the second data item.

With reference to FIGS. 7 and 5*a-c*, a method for parsing a directory structure in order to delete a file 19, 21 in a storage node 15 is disclosed.

In similarity to the disclosure in relation to FIG. 4, the starting point of the directory structure may be a predefined but arbitrary root key. This key may be stored outside of the storage cluster and may be used to identify the first data item (e.g. collection object 19*a*) in the directory structure.

In block 70, the server 7 may receive the root key and may pass the unique identifier to identify the file within the storage system to the API.

In block 71, the API 11 may resolve the path to the desired data item according to the method above.

In block 72, the API 11 in the server 7 may multicast a query regarding the location of the data item (e.g. the collection object 19*c*) including the identifier to storage nodes 15*a-e* in the storage system, or to a subset of the nodes, e.g. within a specific cluster, for example using the data item identifier configuration disclosed in relation to FIG. 3.

In block 73, storage nodes 15 *a-e*, in response to receiving the multicast message, may scan their respective storage medium 17 to locate data item identified by the data item ID 34.

In block 74, the nodes that locate the data item may reply with information regarding other nodes that may store the data item and the current execution load in the node. The requested data item may be stored in a plurality of storage nodes. The API may collect the information received from the nodes and may wait until it has received answers from more than 50% of the listed storage nodes that contains the data item before making a decision on which nodes to select for the deletion of the data item.

In block 75 the API 11 may send a unicast request to delete the specific file (e.g., the collection object 19*c*) to the chosen storage nodes.

In block 76 the identifier field 22*b* in a data item one level higher in the directory structure (e.g. the collection object 19*b*) may be updated by deleting the reference to the deleted data item (e.g. the collection object 19*c*). The update may occur by retrieving the first data item according to the read method described above and/or by accessing the first data item directly, for example if the server cached the identifier of the first data item. In the case where the data item to be deleted is located a number of levels down in the directory structure, the delete operation may be expressed as the method disclosed in relation to FIG. 4 with the addition of i) deleting the first data item, and ii) updating the second data item by deleting the reference to the first data item.

Thus, a data deletion method may be implemented in a data storage system including data storage nodes interconnected by means of a communications network. The method may include deleting a first data item stored in at least one storage node. The method may also include updating a second data item, stored in at least one storage node, by deleting a reference to the first data item in the second data item.

The collection objects 19 may be handle and maintained in manner similar to data files. This may allow the data to be stored in a flat storage structure, e.g. without any subdirectories or within a single directory. A virtual hierarchical storage structure may be created by adding collection objects 19 including references to other collection objects 19 and/or data files 21. It even allows the same data to be organized in several different virtual hierarchical storage structures by using different sets of collection objects 19.

For data security reasons, some or all information stored in the storage system (e.g. the collection objects 19 and/or the data files 21) may be stored redundantly in the storage system. The collection objects 19*a-c* and the data file 21*a* may be stored at two or more storage nodes 15. Each instance of a collection object or data file may be associated with the same identifier. In such a case, the above-described read method may result in a response from each storage node storing the collection object. A redundantly stored collection object may thus be retrieved from either one of or all of the storage nodes storing the collection object.

Several embodiments which demonstrate the disclosed method and system have been described. However, as is readily appreciated by a person skilled in the art, other embodiments in addition to the ones disclosed above are equally possible that are in accordance with the methods and products described herein. The foregoing examples are not meant to be limiting, and the scope of the protection is to be defined by the appended patent claims.

What is claimed is:

1. A method comprising:
   identifying, within a collection object stored in a data storage system, a reference to a data item stored in the data storage system, the collection object corresponding to a directory of a distributed file system and the reference including an address of the data item in the storage system;

determining, based on the reference within the collection object, that a storage location of the data item is within a cluster of storage nodes included in the data storage system;

sending, based on the determining that the storage location of the data item is within the cluster of storage nodes, a request for the data item to the storage nodes included in the cluster;

receiving, in response to the request, one or more responses from one or more storage nodes, the one or more responses indicating that the one or more storage nodes each store the data item;

selecting, based on data included in the one or more responses, a particular storage node included in the one or more storage nodes;

sending an additional request for the data item to the particular storage node; and receiving, in response to the additional request, the data item from the particular storage node;

wherein the identifying, the determining, the sending of the request, and the receiving of the data item are performed using an application programming interface (API).

2. The method of claim 1, wherein the selecting of the particular storage node comprises determining, based on the data included in the one or more responses, that the particular storage node has a lowest execution load out of all storage nodes included in the one or more storage nodes.

3. The method of claim 1, wherein the additional request comprises a unicast request.

4. The method of claim 1, wherein:
the collection object represents a directory in a virtual file structure; and
the data item is
a second collection object that represents a subdirectory of the directory in the virtual file structure, or
a data file that includes payload data.

5. The method of claim 4, wherein:
the collection object and the data item are stored in an unstructured storage layer of the storage system; and
the virtual file structure implements a structured layer for the unstructured storage layer.

6. The method of claim 1, wherein the API is executed by a device configured to communicate with the data storage system by way of a network.

7. The method of claim 1, wherein the API is executed by a storage node included in the data storage system.

8. The method of claim 1, wherein:
the address comprises a multicast address; and
the sending of the request comprises sending a multicast request to the multicast address.

9. The method of claim 1, further comprising:
Identifying, within the data item, a reference to an additional data item stored in the data storage system;
determining, based on the reference to the additional data item, that a storage location of the additional data item is within a second cluster of storage nodes included in the data storage system;
sending, based on the determining that the storage location of the additional data item is within the second cluster of storage nodes, a request for the additional data item to the storage nodes included in the second cluster; and
receiving, based on the request for the additional data item, the additional data item from a particular storage node included in the second cluster.

10. The method of claim 9, wherein the second cluster of storage nodes is the cluster of storage nodes.

11. The method of claim 9, wherein the second cluster of storage nodes is different than the cluster of storage nodes.

12. A device comprising a processor configured to:
identify, within a collection object stored in a data storage system, a reference to a data item stored in the data storage system, the collection object corresponding to a directory of a distributed file system and the reference including an address of the data item in the storage system;

determine, based on the reference within the collection object, that a storage location of the data item is within a cluster of storage nodes included in the data storage system;

send, based on the determining that the storage location of the data item is within the cluster of storage nodes, a request for the data item to the storage nodes included in the cluster;

receive, in response to the request, one or more responses from one or more storage nodes, the one or more responses indicating that the one or more storage nodes each store the data item;

select, based on data included in the one or more responses, a particular storage node included in the one or more storage nodes;

send an additional request for the data item to the particular storage node; and receive, in response to the additional request, the data item from the particular storage node;

wherein the identifying, the determining, the sending of the request, and the receiving of the data item are performed using an application programming interface (API).

13. The device of claim 12, wherein the device is implemented by a server configured to communicate with the data storage system by way of a network.

14. The device of claim 12, wherein the device is implemented by a storage node within the data storage system.

15. The device of claim 12, wherein:
the second data item is
a second collection object that represents a subdirectory of the directory, or
a data file that includes payload data.

16. The device of claim 15, wherein:
the collection object and the data item are stored in an unstructured storage layer of the storage system; and
the virtual file structure implements a structured layer for the unstructured storage layer.

17. The device of claim 12, wherein the selecting of the particular storage node comprises determining, based on the data included in the one or more responses, that the particular storage node has a lowest execution load out of all storage nodes included in the one or more storage nodes.

* * * * *